July 20, 1954
A. H. SHARPE
2,684,198
NEGATIVE TOTAL TAKING MEANS FOR COMBINED
TYPEWRITING AND COMPUTING MACHINES
Filed Dec. 23, 1950
3 Sheets-Sheet 1
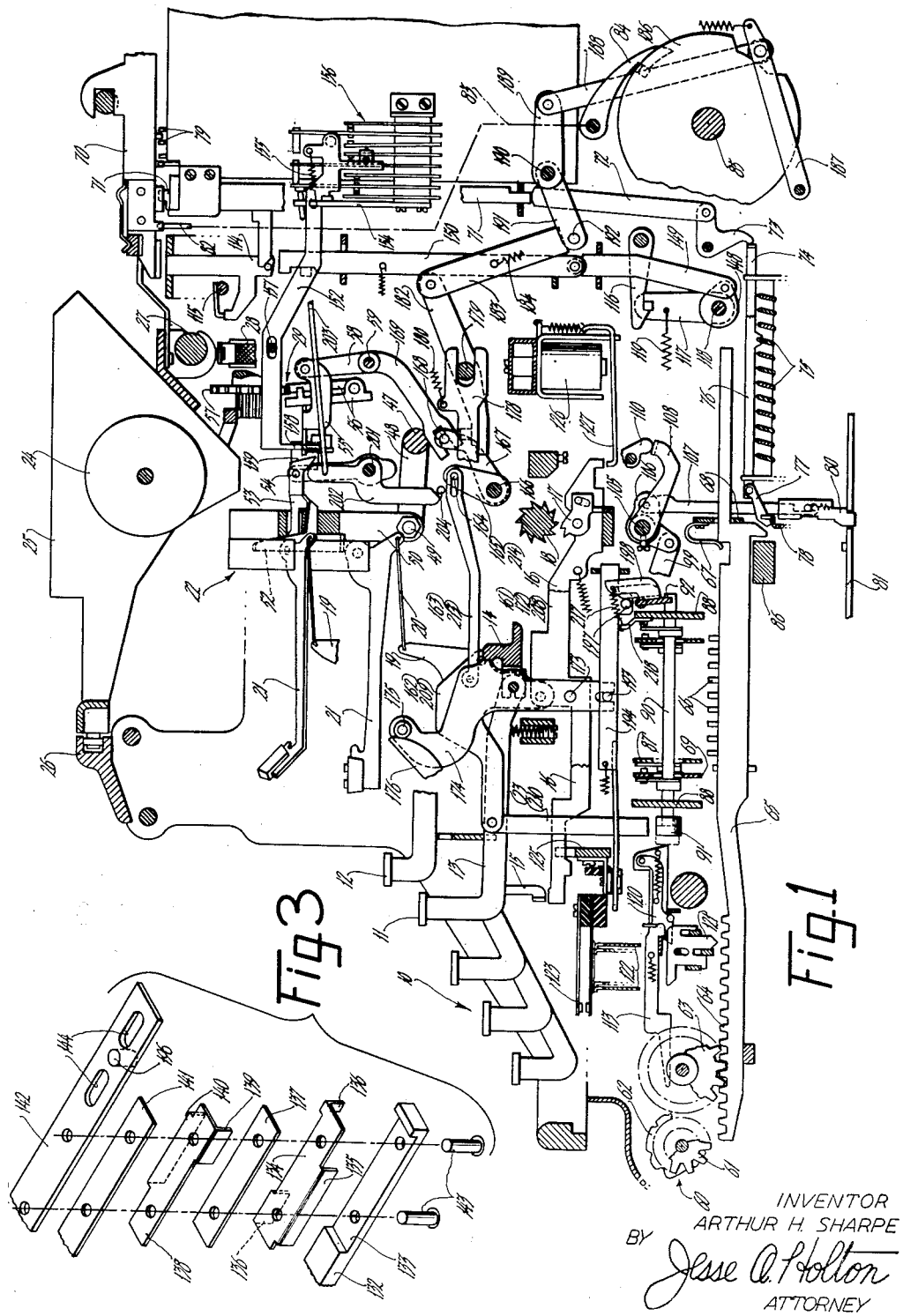
INVENTOR
ARTHUR H. SHARPE
BY
Jesse A. Holton
ATTORNEY

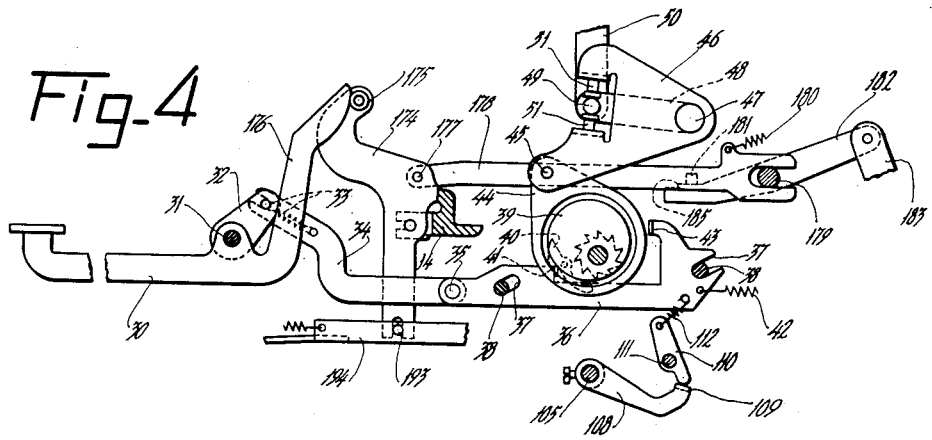
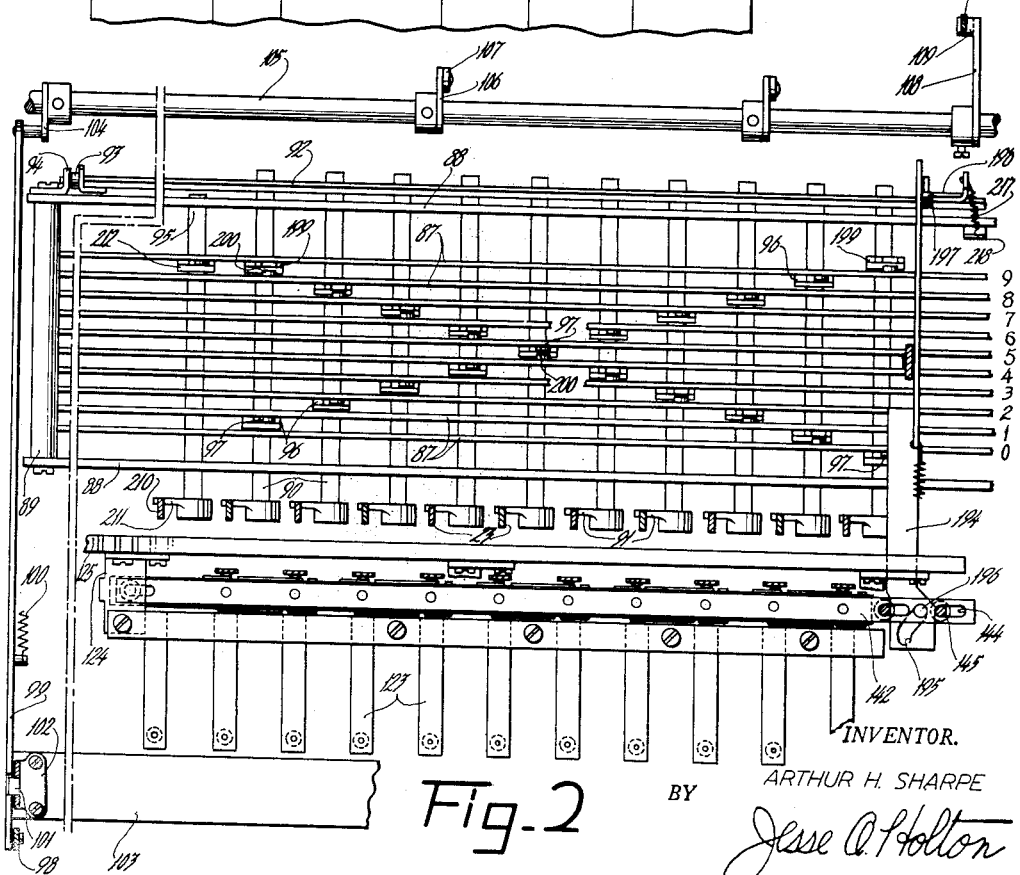

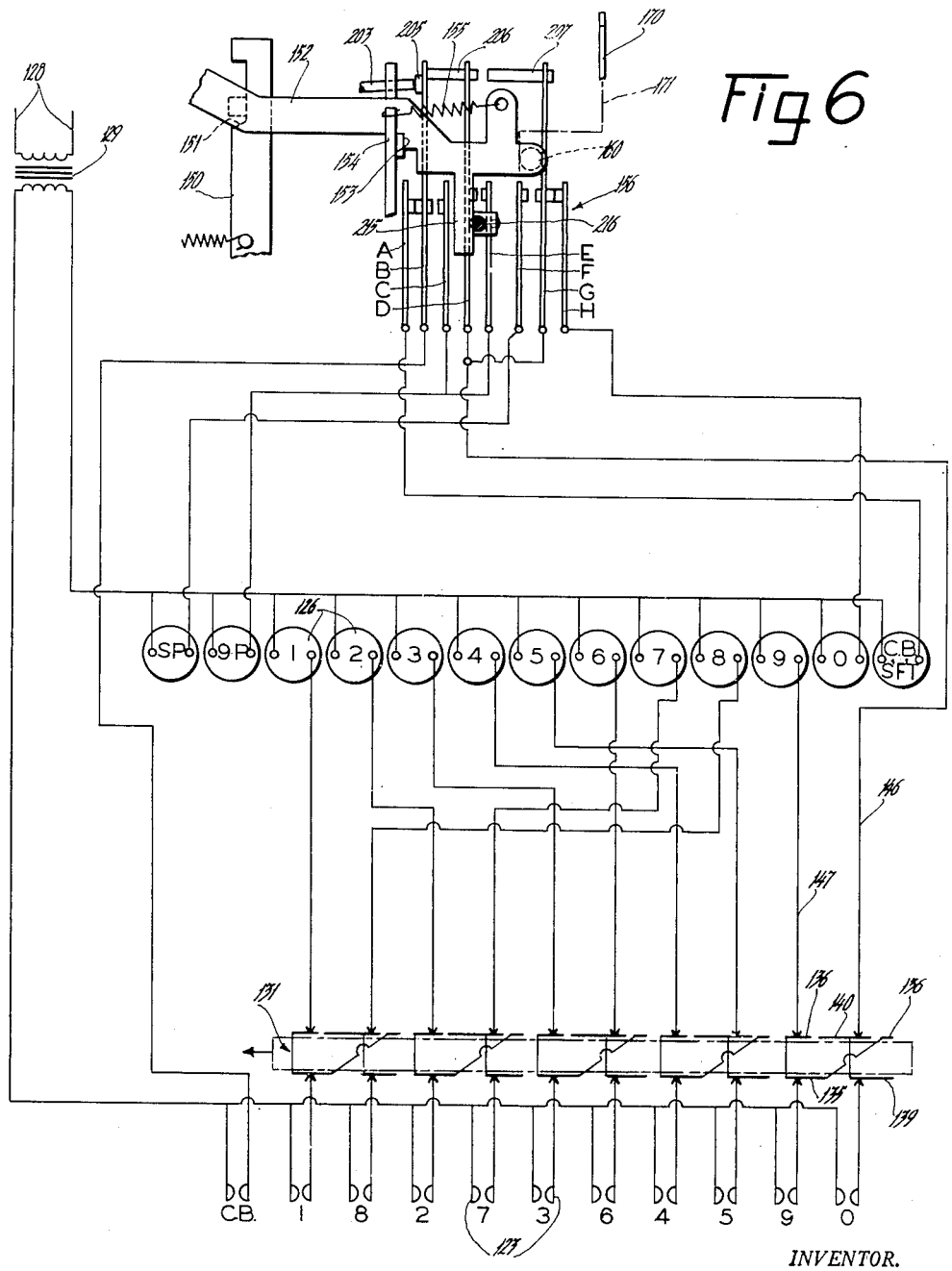

Patented July 20, 1954

2,684,198

UNITED STATES PATENT OFFICE 2,684,198

NEGATIVE TOTAL TAKING MEANS FOR COMBINED TYPEWRITING AND COMPUTING MACHINES

Arthur H. Sharpe, West Hartford, Conn., assignor to Underwood Corporation, New York, N. Y., a corporation of Delaware Application December 23, 1950, Serial No. 202,448

2 Claims. (Cl. 235—60.22)

The present invention relates to improvements in a combined typewriting and computing machine of the type exemplified in Patent No. 2,192,365, issued March 5, 1940, in the name of H. L. Pitman and more particularly involves improvements over that form of the machine described in Pitman Patent No. 2,393,395, issued April 16, 1946.

In general, the machine of the present invention comprises a typewriting section surmounting a computing section, the computing section including a plurality of add-subtract register or totalizers and differential actuators for running indexed amounts selectively additively or subtractively into the wheels of the registers under the action of a general operator mechanism.

The indexing operation is performed by the numeral type actions of the typewriting section; and in the patents refered to above, the digits indexed were the same as the digit type actions which were operated, thus if the "5" type action was operated, a "5" would be indexed and eventually run into one or more of the registers. In the present machine, when a negative total is printed, the digits indexed are the "nines" complements of the digit type actions operated and herein lies one of the improvements of this invention over the prior art, as will presently appear.

The present machine, like those of the patents referred to above, is provided with means for automatically reading out the totals standing in the registers and printing the same. Since the machine will print negative totals as well as positive totals and since the registers are blind, that is they cannot be seen by the operator, it is desirable that some automatically operable means be provided whereby the printed totals may be readily distinguished, and for that purpose, this machine, like those referred to above, prints the different types of totals in different styles of type. However the manner of accomplishing this result is not the same in the present machine, and this constitutes another improvement over the art.

One form of work commonly performed by this machine, as well as by those referred to in the above mentioned Pitman patents, involves the manual typing of an Old Balance followed on the same horizontal line by the manual typing of Debit and Credit entries and the automatic printing of the New Balance. As indicated above, if the algebraic sum of the Old Balance, the Debits and the Credits, is a negative quantity, the new balance will be printed in a different style of type than if the New Balance is a positive amount. In machines of the Pitman type, when a negative New Balance is later manually typed as an Old Balance, the style of type is the same as when said balance is a positive one. With the present machine it is possible to print the Old Balance in the same style of type as the last New Balance, regardless of whether said balance is positive or negative, thus making it possible by casual inspection of a completed work sheet to determine which of the Old Balances are negative in character and likewise making it possible to more readily associate the particular Old Balances with their respective New Balances. As will later be more readily apparent, substantial changes in the total printing mechanism and in the indexing means, must be made in order to accomplish this result.

It is a primary object then of this invention, to provide a combined typewriting and computing machine having means whereby automatically printed New Balances may be distinguished as to their positive or negative character by the style of type in which they are printed and wherein manually typed Old Balances may be printed in the same style of type as their respective new balances.

It is a further object of this invention to provide various new mechanisms and arrangements of parts whereby the primary object may be obtained.

These and further objects, features and advantages will become more readily apparent as the description of a preferred embodiment of the invention proceeds.

Referring now to the drawings:

Figure 1 is a side elevational view, partly in section, of a machine embodying the present invention, Figure 2 is a plan view of the indexing means, employed in the present machine and showing a portion of the total printing mechanism, Figure 3 is an exploded view of a portion of a complemental switch employed in the total printing mechanism, Figure 4 is a side elevational view of a portion of the case shift mechanism, Figure 5 is a diagrammatic showing of one type of work performed by this machine, and Figure 6 is a circuit diagram.

The typewriting section is generally similar to that of the machine described in the Patent No. 2,398,395 and comprises a standard keyboard 10 including a row of numeral keys 11 and a row of decimal tabulator keys 12. Each numeral key is carried by a key lever 13 pivotally mounted on a cross member 14 and each key lever is provided with a pendant 15 which, when a numeral key is depressed, strikes against one end of an actuator 16 to rock said actuator and move a toothed pawl 17 carried by the other end thereof into engagement with a rotating power shaft 18. Each actuator is pivotally connected near its midpoint to one arm of a three armed intermediate lever 19. The levers 19 are pivotally mounted on the cross member 14 and one arm of each lever is connected by a link 20 to one arm of a type bar 21 which is in turn pivotally carried by a case shiftable basket, generally designated 22. The third arms of the intermediate levers 19 each pivotally carry a pendant 23 for operating an indexing means, as will presently be described. Thus it will be apparent that when a numeral key is depressed, the power shaft 18 will rock one of the intermediate levers 19 to thereby swing the associated type lever about its pivot and cause the type face thereof to strike against a line-spaceable roller platen 24.

The platen 24 is mounted in the usual letter spaceable carriage 25 carried by front and rear rails 26 and 27 respectively. The carriage is urged in a letter feed direction by the usual spring drum 28 and normally limited to a step-by-step motion by its usual escapement mechanism, generally designated 29.

The case shift mechanism is substantially similar to that shown in Patent No. 2,398,395 but since such mechanism forms a vital part of the present invention it will be fairly fully described herein. Referring to Fig. 4, a case shift key lever 30 is fixed to a rock shaft 31 journaled in the typewriter housing. An arm 32 fixed to said rock shaft 31 has a pin-and-slot and spring connection 33 to a connecting link 34 pivotally connected at 35 to a slide 36 having slanted slots 37 slidably fitting stationary studs 38. An eccentric 39 is rotatable about the axis of the power shaft 18 and a clutch dog 40 is pivotally mounted on said eccentric and spring urged toward engagement with said power shaft. The clutch dog 40 however, is normally held out of engagement with said power shaft by means of a shoulder 41 on the slide 36, said slide being held in the position shown by means of a light spring 42.

When the case shift key lever 30 is rocked in a counterclockwise direction, as by depression of the key, the pin-and-slot and spring connection 33 draws the slide 36 downward and toward the left to disengage the shoulder 41 from the clutch dog 40 and thereby allow said dog to move into engagement with the power shaft 18 and clutch the eccentric 39 to said shaft. As the shoulder 41 moves away from the clutch dog, a second shoulder 43 on the slide 36 moves to a position to intercept said dog and disengage same from the power shaft after the eccentric has turned a half of a revolution. Thus, each time the shift key lever 30 is rocked counterclockwise, the eccentric 39 is rotated 180° from the position shown in Fig. 4 and remains in said rotated position as long as the key lever 30 is held depressed, either by the force of the operator's finger on the key or by suitable shift lock mechanism, not shown.

A strap 44 is journaled on the eccentric 39 by means of ball bearings, not shown, and is pivotally connected at 45 to a rocker 46 swingable about the same axis as a rock shaft 47. The rock shaft 47 is provided with a pair of side arms 48 carrying studs 49, only one of which is shown, by means of which said rock shaft is operatively connected to a type bar segment 50 of the shiftable basket 22, as shown in Fig. 1. The rocker 46 is provided with abutment screws 51 which bear against one of the studs 49. Thus as the eccentric 39 is rotated 180° from its Fig. 4 position, the rocker 46 moves the type basket 22 downward to thereby provide a case shift operation. Each type bar is provided with the same digit for lower and upper case but the digits are of different styles of type, for a reason later to fully appear.

The escapement mechanism 29 is identical with that fully described in the Pitman Patent No. 2,398,395. Whenever a type bar 21 is operated, a universal bar 52 moves toward the rear, and a pair of arms, one of which is indicated in Fig. 1 at 53, moves a cross rod 54 rearwardly to move a slidable frame 55 into engagement with the usual escapement dogs 56 and rock said dogs so that one of them moves out of engagement with the teeth of a star wheel 57 while the other moves into engagement therewith. As the type bar returns, the dogs 56 rock in the opposite direction under the action of a spring, not shown. This rearward and forward rocking of the dogs 56 allows the carriage to move one letter space, as is well known. The frame 55 is pivotally connected at its rear edge to a pair of arms 58, only one of which is shown, and said arms are fixed to a rock shaft 59. Thus, by rocking the shaft 59, in a manner to be presently described, the same escapement action will take place as takes place upon operation of a type action.

Except for the indexing means, which will later be fully described, the computing section of the present machine is substantially similar to that of the machine described in the above referred to Pitman Patent No. 2,192,365. Thus in general, the computing section has located in the forward portion thereof a plurality of add-subtract registers, each of which comprises a plurality of axially aligned wheels 60. Only one wheel of one register is shown in the present drawings but it will be understood that all of the other wheels are axially aligned with the wheel 60. The register wheels are of a compound construction and comprise a gear 61 and a disk 62 having a spiral array of digit stops, each stop representing a digital value, as will be understood. Located adjacent the wheels 60, but normally out of mesh with the gears thereof, are a group of idler gears 63, there being an idler gear corresponding to each of the register wheels, and these idler gears are meshed with teeth 64 provided on the forward ends of a group of differential actuators 65.

The differential actuators 65 are each provided with a row of indexible or settable pins 66 representing the digits from "0" to "9." These actuators or pin bars are normally positioned by spring devices 67 against a guide comb 68 so that their pins 66 are out of line with corresponding pin setting blades 69.

For each computing zone, the typewriter carriage 25 is provided with a column unit 70 adapted to depress seriatim a series of denominational jacks 71. Each jack, when depressed, operates, through a push link 72 and a bell crank 73, a master rack 74 which is connected through a rockable cross blade 75 to a distributive rack 76. There is, of course, a set of distributive racks 76 for each register. Each rack 76 is provided with a coupler 77 liftable by a plate 78 into operative alignment with the corresponding one of the differential actuators 65. Upon entry of the carriage into a computing zone, the column unit 70 depresses one or more of a series of control plates 79 to raise the corresponding coupler lifting plate or plates 78 by means of an operative connection not shown, so that subsequent traverse of the jacks 71 by the column unit will advance the differential actuators seriatim to indexing position beneath the blades 69. The blades 69 are operated in a manner to be presently described to index the pins 66. During the traverse of the computing zone, the column unit 70 depresses other control plates not shown, to release one or both of a pair of latches 80, only one of which is shown in Fig. 1, to permit a state-control bar 81 to move forward to an addition or a subtraction determining position. As the carriage steps out of the computing zone, the column unit 70 passes over a cycle trip dog 82 which, by means of a connection diagrammatically indicated by chain-dotted line 83, raises a clutch dog 84 and allows a general operator shaft 85 to make one revolution. During the rotation of the shaft 85, the selected register moves down to engage its wheels 60 with the teeth of the differential actuators, if addition has been selected, or back to engage the idler gears 63, if subtraction has been selected, and a general operator bar 86 moves forward and back to pick up the indexed pins 66 and move the bars 65 forward differential amounts to run the indexed amount into the register. The above description of the operation of the indexing and running of amounts into the registers is somewhat sketchy but it is the same as fully described in the Pitman Patent No. 2,192,365.

The fields of pins 66 constitute index means and during normal adding and subtracting operations the index means is indexed in much the same manner as described in the Patent No. 2,192,365. For operating the pins 66, an indexing means is provided consisting of a plurality, ten, to be specific, of linkages including the aforementioned blade 69 and a corresponding set of upper blades 87, said upper and lower blades being connected together at their ends by bell cranks, not shown, to form parallelograms, as shown in the patent to Schneble, No. 2,318,425. These pin-setting linkages are mounted in a frame comprising transversely extending side members 88 tied together at their ends by posts 89, one of which is shown in Fig. 2.

Slidably and turnably mounted in the side members 88 are ten shafts 90, each of which has secured to one end thereof a crank arm 91, and said shafts are provided at their opposite ends with a notch into which fits the lower edge of a rockable blade 92. The blade 92 is provided at its ends with pintles 93 adjacent its upper edge about which pintles said blade is adapted to be rocked, to thereby slide the shafts 90 endwise, in a manner and for a purpose to be presently described. The pintles 93, one of which is shown in Fig. 2, are mounted in brackets 94 carried by the rear side member 88. There is an eleventh shaft, shown in Fig. 2 and designated 95, rotatably but non-slidably mounted in the side members 88 and the purpose of this eleventh shaft will be described later.

In Fig. 2, for purposes of simplifying the disclosure, small numerals have been placed adjacent the right hand ends of the blades 87 to indicate the digital value of the pins 66 corresponding to said blades. Each of the shafts 90 is provided with a bifurcated crank arm 96, the bifurcation of which under normal conditions fits over a pin 97 provided on each of the blades 87. Thus when a shaft 90 is rocked, its crank arm 96 will move its blade 87 toward the left, and due to the parallelogram arrangement of the blades 87 and 69, the blade 69 will move down to set a pin in the differential actuator 65 which has been moved forward, as hereinabove pointed out, to pin setting position. The shafts 90 are rocked by the pendants 23 striking against the crank arms 91 when a type action is operated.

Thus during normal item entry operations, when a numeral key 11 is depressed, its actuator 16 is moved into engagement with the fluted power shaft 18 to cause a power operation of the type action corresponding to the numeral key, and the pendant 23 on the intermediate lever 19 of said type action moves down to rock its shaft 90 and thereby index a pin 66 corresponding to the digital value of the numeral key. This is true of normal subtractive operations as well as additive operations. The typewriter being normally in lower case condtion, the numerals will be printed in a particular style of type, for example upright or vertical.

As was previously mentioned, though the particular manner of accomplishing the result has not as yet been explained, this machine automatically prints negative totals in a different style of type from positive totals. Now the type face for the negative totals is located in the upper case position on the type bars and in this machine unlike the machines of the Pitman patents herein referred to, the digit on the lower and upper case of the type bars is the same, they merely being of different styles of type.

Assuming that the last automatically printed New Balance was a negative amount and it is desired to print that amount manually in the Old Balance column of a statement, and print it in the same style of type as was used in the New Balance column. It is necessary of course to shift to upper case and since, as will be appreciated, the machine is normally conditioned by the column unit 70 to perform addition in the Old Balance column, most Old Balances being of a positive character, it is also necessary that the machine be manually conditioned to perform subtraction, since this amount must of course be run into the register subtractively. On the left hand side of the keyboard is a Credit Balance key. The key itself is not shown but the key stem is shown in Fig. 2 at 98 and the lower end of said key stem rests upon a pin provided in the end of a link 99. The link 99 is urged rearwardly and upwardly by a spring 100 and is provided with a notch in its upper edge adjacent the key stem 98, said notch normally accommodating a tab 101 provided on a member 102 secured to a frame member 103 of the computing section. The tab 101 normally holds the link 99 in the position shown in Fig. 2. The rear end of the link 99 is pivotally connected to an arm 104 fixed to a cross shaft 105 and other arms 106 fixed to said shaft are pivotally connected to members 107 for operating those ones of the latches 80 which cause subtractive operations, as seen in Figs. 1 and 2. To one end of the cross shaft 105 is secured an arm 108 having a tab 109 bearing against the nose of a lever 110. As best seen in Fig. 4, the lever 110 is rockable upon a shaft 111 and its end opposite the nose against which the tab 109 bears is connected by a spring 112 to the slide 36.

Thus when the Credit Balance key is depressed, the notch in the link 99 is pressed below the tab 101 and the spring 100 thereupon pulls said link rearwardly, rocking the cross shaft 105 to remove the subtraction determining latches 80 from the state-control slides 81, so that during the automatic cycle following the printing and indexing, the amount will be run into whichever registers have been selected by the column unit 80. Rocking of the shaft 105 also causes the arm 108 thereon to rock the lever 110 and move the case shift slide 36, through the spring 112, toward the left to give a case shift operation, as previously explained. During the succeeding cycle, suitable means, not shown, returns the link 99 to its normal position, thereby rocking the cross shaft 105 in the opposite direction to restore the subtraction determining latches and to allow the spring 42 to restore the slide 36, whereupon the machine shifts back to lower case, as previously explained.

For purposes of automatically reading out and printing the total standing in the registers, total sensing means is provided in the form of groups of digit sensing fingers 113. There is a finger 113 corresponding to each register wheel 60. Upon depression of a Total key, not shown, a tabulator reed 114 is raised and through rocking of a shaft 115 by said reed, the escapement mechanism is disabled, thereby allowing the carriage to move under the force of the spring drum 29 to the columnar position wherein the total is to be printed. In this position, a control plate is operated by the column unit 70 to raise a latch 116 from engagement with an arm 117 on a shaft 118 and a spring 119 thereupon rotates the shaft 118 which allows the digit sensing fingers 113 to move forward into engagement with the spiral array of stops on the wheels 60, as more particularly explained in the Pitman Patent No. 2,398,395.

Each of the fingers 113 is provided with a swingable arm 120, and during total taking operations, the arms 120 are raised seriatim by a group of interponent plates 121 to raise one of a series of blades 122 to thereby close a switch 123 corresponding to each of the digits sensed by the fingers 113. The means for operating the switches 123 is identical with that described in Pitman Patent No. 2,372,613, issued April 3, 1945, and need not be further explained herein. The switches 123 are carried by brackets 124 secured to a rigid cross member 125, the upper edge of which is provided with notches and serves as a guide comb for the forward ends of the type bar actuators 16.

As seen in the wiring diagram, Fig. 6, there is a solenoid 126 corresponding to each of the switches 123 and each solenoid has an armature 127, Fig. 1, which, when a solenoid is energized, raises one end of an actuator 16, or another actuator to be described, so that it engages the power shaft 18. The power for operating the solenoids is derived from a line 128 after passing through a transformer 129.

The wires leading from the switches 123 to the solenoids 126 pass through a transposing switch generally indicated at 131. Said transposing switch is constructed as shown in Fig. 3 and comprises a lower insulating member 132 having a series of notches 133 therein corresponding to the switches 123. A thin copper member 134 having an elongated ear 135 and a pair of short ears 136 is fitted into each notch 133. A strip 137 of insulating material separates the member 134 from a second thin copper member 138 having a single short ear 139 and an elongated ear 140. An upper insulating member 141 extends along the length of the lower member 132 and insulates the entire switch from a carrying slide 142. The slide is secured to the switch by rivets 143 and is provided with elongated guide slots 144 by means of which said slide is carried by and guided upon pins 145, Fig. 2, secured to the brackets 124. From an inspection of Fig. 6, it will be apparent that when the switch 123 designated "0," for example, is closed the current will flow from the ear 139 through the ear 140 to the wire 146. Likewise, when the switch designated "9" is closed, the current will flow from the ear 135 to the two ears 136 and from the left hand ear 136 to the wire 147. As will later be more fully explained, when the transposing switch 131 is moved to the left, closing of the "0" switch will cause current to flow through the wire 147 and closing of the "9" switch will cause current to flow through the wire 146.

As previously stated, when the Total key is operated, the shaft 118 is rocked in a counter-clockwise direction by the spring 119. An arm 148 is fixed to the shaft 118 and said arm is pivotally connected to a link 149 upon the upper end of which rests a push link 150. Thus when the Total key is operated, the push link 150 is raised and a shoulder 151 on said link raises an arm 152 so that a shoulder 153 thereupon is released from engagement with a member 154. A spring 155 then moves the arm 152 toward the left as viewed in Figs. 1 and 6 to thereby condition a group of switches, generally designated 156, for the total printing operation. The arm 152 is pivotally and slidably mounted upon a stud 157, Fig. 1, so that when it is raised to disengage its shoulder 153 from the member 154 and is moved toward the left by the spring 155, a nose 158 on said member moves to a position wherein it will be struck by a nose 159 on the universal bar carrying arms 53 whenever said universal bar is operated, for a purpose to presently appear.

The switches 156 are comprised of contacts carried by resilient arms, which for convenience have been indicated in Fig. 6 by the reference letters A through H. The bias of the arm G is such as to cause the switch G—H to open and the switch F—G to close as soon as a pin 160 on the arm 152 moves away. With the other arms in the position shown, the switch 156 is thus in condition for the total printing operation.

Supposing the total standing in the register to be a plus 100.00 dollars, it will be understood that the wheels 60 will stand at: 000000100 00, and that these are the digits which will be sensed when the fingers 113 move forward. Since all of the digits to the left of the "1" are insignificant, it is of course desirable not to print them. Thus when the first left hand "0" is sensed the "0" switch 123 will be closed, and through the transposing switch 131 the current will flow through the wire 146 as aforesaid and through the now closed switch F—G to the "space" solenoid SP. This "space" solenoid, like the numeral solenoids 126 has an armature underlying one end of an actuator similar to the actuators 16. A portion of the "space" actuator has been indicated in Fig. 1 at 161 and this "space" actuator is pivotally connected to an intermediate lever 162 similar to the intermediate levers 19. There is of course no type action connected to the intermediate lever 162 and this lever also carries no pendant similar to the pendants 23 because it is not necessary to set the "0" pins 66, since, as explained in the Pitman patents referred to above, the "0" pins are all set at the end of each cycle of operation of the machine. A link 163 is connected at one end to the intermediate lever 162 and at its other end is connected by a lost motion connection 164 to an arm 165 fixed to a cross shaft 166. Another arm 167 is also connected to the shaft 166 and the arm 167 has a pin-and-slot connection 168 to an arm 169 secured to the hereinbefore referred to rock shaft 59. Thus, when the "space" solenoid is energized, the shaft 59 will be rocked in a clockwise direction to operate the escapement mechanism 29 to allow a letter space movement of the carriage.

As the carriage moves, the "0" switch 123 will be opened, as explained in the Pitman Patent No. 2,372,681, but since the next order wheel of the register also stands at 0 the "0" switch 123 will again be closed, thus reenergizing the "space" solenoid to cause another letter spacing movement of the carriage. It will be understood that this operation is continued until the "1" is sensed. Upon the sensing of the "1" the "1" switch 123 is closed to energize the "1" solenoid directly without going through the switches 156. When the "1" solenoid is energized the intermediate lever 19 of the "1" type action is of course operated to thereby print the "1" and also to index a "1" in the differential actuator 65 which has been moved forward to pin setting position. As the universal bar 52 is operated during the movement of the "1" type bar 21, the nose 159 on the arm 53 presses against the nose 158 on the arm 152, thereby restoring the arm 152 to the position shown in Figs. 1 and 6 where its shoulder 153 latches over the member 154. The switches 156 are thereby restored to the position shown, so that as the succeeding zeros are sensed and the "0" switch 123 is closed the current will flow through the switch G—H to the "0" solenoid to thereby operate the "0" type action.

If all the wheels of the register stand at zero it may be desirable to print the two zeros for the tens of cents and cents positions, in which case it is merely necessary to add a control plate diagrammatically indicated in Fig. 6 at 170 in position to be struck by the column unit 70 as the column unit reaches the decimal place position. The control plate 170 will have connections indicated by the chain-dotted line 171 so that as said plate is depressed the connections 171 will strike against the pin 160 on the arm 152 to restore said arm to the position shown in the drawing. As pointed out above, this restoring of the arm 152 will cause the "0" solenoid to be energized when the "0" switch 123 is closed.

If the amount standing in the register at the time of a total taking operation should be minus 100.00 dollars, the wheels will of course stand at 999999899 99, as explained in the Pitman Patent No. 2,372,681, and it is therefore necessary that the index means 66 be indexed 999999899 99 in order that the wheels of the register will be cleared during the succeeding cycle, it being understood that in the present machine the register wheels are always rotated in a subtractive direction to clear the register after automatic total printing operations, regardless of whether the total is positive or negative. Since it is desired to print the negative totals in a different style of type from the positive totals it is necessary to have a case shift operation and since the type bars have the same digits on upper and lower case it is necessary to provide an arrangement for setting a pin 66 corresponding to the "nines" complement of the digit being typed. It is also necessary to provide some means whereby the digits typed will be the "nines" complement of the digits standing in the register. In order to effect this complemental printing and complemental indexing, the machine is provided with negative amount sensing means identical to that described in the Pitman Patent No. 2,398,395. The highest order wheel or ultradenominational wheel of each register is provided with a special stop disk 52, so arranged that when this wheel stands at "9" the feeler 113 for that wheel will not move forward quite as far as when a "9" is sensed in any of the other wheels. Therefore when the arm 120 on the highest order finger 113 is moved up it lifts a different blade 122 than is lifted upon the sensing of an ordinary "9" and instead of closing the switch 123 indicated "9" in Fig. 6, it closes the switch CB. It is of course understood that a "9" in the highest order indicates that the amount is negative in character.

It was above explained that when the Total key is operated, the arm 152 moves to the left, as viewed in Figs. 1 and 6 and that the only effect of this movement of the arm on the switches 156 is to open the switch G—H and close the switch F—G. Thus when the CB switch 123 is closed the CB S'F'T solenoid is energized, the current passing through the switch A—B. This CB S'F'T solenoid, which will hereafter be referred to as the credit balance solenoid, has an armature like that of the solenoids 126 for the numeral type actions which underlies one end of an actuator 172 identical with the actuators 18 and 161. The actuator 172 is pivotally connected at 173 to a case shift lever 174 pivotally mounted on the cross member 14. The lever 174 is provided on its upper end with a roller 175 bearing against an arm 176 of the shift key lever 30.

Thus, when the credit balance solenoid is energized, the case shift lever is rocked counterclockwise, as viewed in Figs. 1 and 4, so that its roller 175 wipes against the arm 176 of lever 30 to rock said lever in a counterclockwise direction and institute a case shift, as previously explained. Pivotally connected to the lever 174 at 177 is a link 178 which has a bifurcated end slidably mounted on a cross shaft 179. The link 178 is urged toward the right, as viewed in Fig. 4 by a spring 180 and is provided with a square stud 181. A lever 182 is pivotally mounted on the shaft 179 and one end of said lever is pivotally connected to a link 183. A spring 184, Fig. 1, pulls down on the link 183 and tends to rotate the lever 182 about the shaft 179. As the lever 174 rotates to case shift position, the link 178 is pulled to the left and a shoulder 185 on the lever 182 snaps behind the stud 181 to thereby hold the lever 174 in case shift position during the total printing operation. During the cycle which takes place after the printing of the last digit of the amount, a disk 186 secured to the main cycle shaft 85 cams outwardly a lever 187 which is connected by a link 188 to an arm 189 fast on a shaft 190, as seen in Fig. 1. Also secured to the shaft 190 is an arm 191 having a pin 192 located beneath the lower end of the link 183, so that during the cycle, the pin 192 raises the link 183 enough to rock the lever 182 counterclockwise to remove the shoulder 185 from engagement with the stud 181 and allow the spring 180 to pull back on the link 178 and rock the lever 174 in a clockwise direction. This rocking of the lever 174 back to the position shown in Fig. 4 releases the case shift lever 30 and allows the machine to return to lower case condition, as previously explained.

The lower end of the lever 174 is connected by a pin-and-slot connection 193 to a slide 194. The forward end of the slide 194 is provided with a cam slot 195, as seen in Fig. 2, and a pin 196 on the complemental switch slide 142 fits into said cam slot. Thus, as the slide 194 moves rearwardly due to the rocking of the lever 174, the complemental switch 131 is moved to the left, as diagrammatically indicated in Fig. 6. When the switch 131 moves to the left the switches 123 become associated with the solenoids 126 corresponding to the "nines" complements of said switches, rather than with the solenoids having the same digital value as said switches. For example, when the "0" switch is closed the current flows from the ear 139 through the ear 140 to the wire 147 rather than to the wire 146 because shifting of the switch 131 moves the ear 140 out of contact with wire 146 and into contact with wire 147 as is apparent from Fig. 6.

The rear end of the slide 194 is provided with a pin 197 which, as seen in Figs. 1 and 2, rests against the edge of a bail 198 secured to the rockable blade 92. As the slide 194 moves rearward, the pin 197 presses against the edge of the bail 198 to thereby rock the blade 92 and cause its lower edge to move the shafts 90 forward. As may be seen in Fig. 2, when the shafts 90 move forward, the crank arms 96 slide off of the pins 97 connecting them to the blades 87 and other crank arms 199 on said shafts move forward to embrace pins 200 to thereby operatively connect each shaft 90 to the blade 87 representing the "nines" complement of the normally connected blade. There is no crank arm 199 associated with the "4" or "5" blade 87 because the crank arm 96 merely moves from the pin 97 connecting it to the "5" blade to embrace the pin 200 carried by the "4" blade. The forward movement of the shafts 90 is so slight that the crank arms 91 fixed thereto remain operatively associated with their respective numeral type action pendants 23. Thus, subsequent typing of a digit of the negative amount will result in the operation of the blade 87 corresponding to the "nines" complement of the digit printed. Since the digit printed is the "nines" complement of the digit standing in the register, the blade 87 which is operated will have the same numerical value as the digit in the register and the pins 66 will be indexed during the total printing operation according to the amount in the register, which in the example referred to above is: 999999899 99.

There is one other thing that takes place during the case shift operation. As the type bracket 22 moves downwards, a shaft 201, see Fig. 1, also moves downward, as fully explained in the patent to Pitman, No. 2,398,395. Pivotally mounted on the shaft 201 is a lever 202 having a bevelled lower end and connected near its upper end to one end of a rod 203. As the shaft 201 moves down, the lower bevelled end of the lever 202 strikes against a stationary pin 204 to thereby rock said lever in a clockwise direction. The rear end of the rod 203 is slidably supported in the member 154 and bears against an insulating tab 205 carried by the upper end of the switch member B, as best seen in Fig. 6. Thus during the case shift operation, the rocking of the lever 202 causes the rod 203 to move rearwardly and by pressing against the tab 205 to open the switch A—B and close the switch B—C. The upper end of the switch member D carries an insulating stud 206 which abuts the switch member B and through said stud, rearward movement of the rod 203 closed the switch D—E. As the arm 152 in its forward movement had caused the switch F—G to close, as aforesaid, an insulating stud 207 carried by the switch member G had moved forward into abutting relation with the stud 206 and now as the rod 203 moves rearwardly the stud 206 presses against the stud 207 to open the switch F—G, but the movement of the switch member G is not sufficient to close the switch G—H. Thus with the machine in case shifted condition, the switches B—C and D—E are closed and the remainder of the switches 156 are open.

As the switch B—C closes, the current flows from the credit balance switch CB through the switch B—C to the nine pin solenoid 9P, the carriage thus far remaining in the highest order position wherein the credit balance switch is closed.

The nine pin solenoid 9P has an armature similar to the solenoids 126 and underlies one end of an actuator 208 identical with the actuators 16. The actuator 208 is pivotally connected to an intermediate lever 209, similar to the lever 162 and said lever is provided with a pendant 210 similar to the pendants 23. As seen in Fig. 2, the pendant 210 rests upon an arm 211 of the shaft 95. An arm 212 is secured to the shaft 95 and is connected by a pin-and-slot connection to the blade 87 representing the digit "9." The shaft 95 is not connected with the rockable blade 92 and hence the case shift operation did not affect this shaft. Thus when the nine pin solenoid is energized, the "9" blade 87 is operated to set a "9" pin 66. This "9" will of course not be printed, because the intermediate lever 209 is not associated with a type bar. There is however a link 213, corresponding to the link 163 and located in alignment therewith, connected at one end to the lever 209 and connected at its other end to an arm 214 identical with the arm 165 secured to the shaft 166, so that as the intermediate lever 209 is operated the shaft 166 will be turned to actuate the escapement, as previously explained.

As the carriage steps to the next highest order position, a "9" is again sensed, in the example given; but since this is an ordinary, though insignificant, "9," the "9" switch 123 will be closed instead of the credit balance switch. Since the complemental switch 131 has been shifted, closing of the "9" switch 123 will cause the current to flow through the wire 146 and the switch D—E of the switches 156 to the nine pin solenoid. This pulsating energization of the nine pin solenoid, with the resultant indexing of "nines" will continue until the "8" is sensed.

Since the complemental switch 131 is still in shifted position, the closing of the "8" switch 123 will energize the "1" solenoid 126 to thereby operate the "1" type action and print a "1." However due to the shifting of the shafts 90, operation of the "1" type action will result in the indexing of an "8" pin 66.

As the "1" is printed, the universal bar 52 is of course operated, to thereby restore the arm 152 to its Fig. 6 position, as previously explained. As the arm 152 is restored, a pendant portion 215 thereof strikes against an insulating block 216 carried by the switch member E to thereby open the switch D—E. The pin 160 on the arm 152 closes the switch G—H.

In the tens of dollars position a "9" is again sensed, in the example given, and this time as the "9" switch 123 is closed, the current flows through the complemental switch 131 to the wire 146 and thence through the switch G—H to the "0" solenoid 126. All of the remaining zeroes are printed in this manner and since the shafts 90 are still in shifted position, "nines" will be indexed in the order positions wherein the zeroes are printed.

During the cycle following the printing of the last digit, the case shift mechanism is restored to lower case position, as previously explained, and when the lever 174 rocks back to its normal position, its pin-and-slot connection 193 moves the slide 194 to its forward position to thereby restore the complemental switch 131 to normal position. As the slide 194 moves forward, a spring 217 extending between the upper edge of the bail 198 and a tab 218 on the member 88 rocks the blade 92 back to the position shown in Fig. 1 to thereby restore the shafts 90 to normal position. A suitable spring, not shown, restores the rod 203 to its normal position, whereupon the switches 156 take up the positions shown in Fig. 6, in readiness for the next total taking operation.

By means of the hereinbefore described mechanisms and arrangements of parts it will be seen that a statement of account having the appearance of that shown in Fig. 5 may be made. In Fig. 5, the New Balance shown in the first line is a negative quality and may readily be recognized as such by the oblique style of type. When this negative New Balance is later manually typed on the second line in the Old Balance position, the operator, before typing the amount, depresses the Credit Balance key, as aforesaid, to thereby cause a case shift operation and cause the amount to be printed in the same oblique style as was the automatically printed New Balance. In printing the Old Balance of 25 00 dollars, a positive amount, the Credit Balance key is not operated and there is therefore no case shift and this amount is printed in an upright or vertical style of type.

Having thus described a preferred embodiment of the invention, what is claimed is:

1. A combined typewriting and computing machine comprising a set of numeral type bars each of which is provided with the same digit for lower and upper case but said digits being of different styles of type, a platen against which said type bars are adapted to strike, case shift mechanism for effecting a relative shift between said type bars and said platen, power means for operating said case shift mechanism, initiating means for initiating operation of said power means, an add-subtract register comprising a plurality of axially aligned wheels, means for sensing the digits standing in said wheels, type bar actuating means operable by said sensing means, negative amount sensing means, said initiating means being operated by said negative amount sensing means, a set of indexable differential actuators, a set of blades for indexing said differential actuators, mechanism associated with said type bar actuating means to normally operate said blades in accordance with the digit being printed, means operated by said initiating means to cause said type bar actuating means to operate said blades in accordance with the "nines" complement of the digit being printed.

2. A combined typewriting and computing machine comprising a set of numeral type bars each of which is provided with the same digit for lower and upper case but said digits being of different styles of type, a platen against which said type bars are adapted to strike, case shift mechanism for effecting a relative shift between said type bars and said platen, case shift mechanism operating means, an add-subtract register comprising a plurality of axially aligned wheels, means for sensing the digits standing in said wheels, type bar actuating means operable by said sensing means, negative amount sensing means, means effective upon the sensing of a "nine" by said negative amount sensing means to actuate said case shift mechanism operating means, a set of differential actuators for said register, index means for said differential actuators, a set of blades for indexing said index means, each of said blades having a digital value, a rockshaft corresponding to each of said blades and having a first arm normally connected to a first one of said blades and having a second arm normally disconnected from a blade representing the "nines" complement of the first blade, mechanism associated with said said type bar actuating means to operate said rockshafts, means operated by said case shift mechanism operating means to shift said rockshafts so as to disconnect the first arms thereof from their blades and connect the second arms thereof to the blades representing the "nines" complement of said first blades.

References Cited in the file of this patent

UNITED STATES PATENTS

| Number | Name | Date |
| --- | --- | --- |
| 2,195,606 | Toggenburger | Apr. 2, 1940 |
| 2,364,758 | Roggenstein | Dec. 12, 1944 |
| 2,398,395 | Pitman | Apr. 16, 1946 |